United States Patent [19]

Sennett et al.

[11] Patent Number: 5,006,574

[45] Date of Patent: Apr. 9, 1991

[54] CATIONCALLY DISPERSED SLURRIES OF CALCINED KAOLIN CLAY

[75] Inventors: Paul Sennett, Colonia; Steven A. Brown, New Brunswick, both of N.J.

[73] Assignee: Engelhard Corporation, Iselin, N.J.

[21] Appl. No.: 309,456

[22] Filed: Feb. 10, 1989

[51] Int. Cl.$^5$ ............................................... C08K 3/34
[52] U.S. Cl. ................................. 523/351; 524/447; 524/446; 106/286.5
[58] Field of Search ............... 524/447, 446; 523/351; 106/484, 487

[56] References Cited

U.S. PATENT DOCUMENTS

| | | | |
|---|---|---|---|
| 4,118,245 | 10/1978 | Hamill et al. | 106/484 |
| 4,118,246 | 10/1978 | Horzepa et al. | 106/484 |
| 4,374,203 | 2/1983 | Thompson | 106/487 |
| 4,495,245 | 1/1985 | Zunker | 524/446 |
| 4,738,726 | 4/1988 | Pratt et al. | 524/447 |
| 4,767,466 | 8/1988 | Nemeh et al. | 106/487 |
| 4,772,332 | 9/1988 | Nemeh et al. | 106/487 |
| 4,859,246 | 8/1989 | Sennett | 106/487 |

Primary Examiner—Allan M. Lieberman

[57] ABSTRACT

A stable fluid acidic concentrated aqueous slurry of positively charged particles of a calcined kaolin clay pigment wherein the dispersant is a water-soluble organic cationic material, such as a quarternary ammonium polyelectrolyte.

5 Claims, No Drawings

CATIONICALLY DISPERSED SLURRIES OF CALCINED KAOLIN CLAY

FIELD OF THE INVENTION

This invention relates to aqueous slurries of calcined clay pigments.

BACKGROUND OF THE INVENTION

Kaolin clay pigments used by the paper and paint industry are available in both uncalcined and calcined grades, both of which bear a negative charge when dispersed in water. When preparing aqueous coating or paper filling compositions containing such pigments, it is frequently desirable to provide the clay in the form of a concentrated suspension (slurry) which is sufficiently fluid at both high and low rates of shear to be handled by conventional mixers and pumps.

In the manufacture of paper and paper board, it is wellknown to incorporate quantities of inorganic fillers into the fibrous web in order to improve product quality. Titanium dioxide is widely used to improve brightness and opacity, but it is an expensive pigment. In recent years, considerable efforts have been made to develop satisfactory replacements for titanium dioxide. Substantially anhydrous kaolin clays prepared by partially or fully calcining a fine particle size fraction of crude kaolin clay is now a replacement pigment of choice. Calcined kaolin clay opacifying pigments, such as the products supplied under the registered trademarks ANSILEX and ANSILEX 93 by Engelhard Corporation are exemplary. These products are substantially anhydrous white pigments and are widely used as fillers in paper sheets and paper board, as a coating pigment for paper, and as a pigment in paints and other filled systems. They consist of aggregates of clay particles, and exhibit exceptionally high light-scattering and opacifying characteristics when incorporated as a filler into paper. The particle size of these pigments is typically at least 65 percent by weight finer than 2 micrometers equivalent spherical diameter (ESD), and at least 50 percent by weight finer than 1 micrometer. The pigments exhibit low Valley abrasion values, generally less than 50 mg., and usually below 30 mg.

It is desirable to be able to ship high solids slurries of calcined clay pigments in tank cars. A high degree of fluidity is required as it is with conventional hydrated kaolin pigments. In many instances, slurry shipments must be sufficiently fluid to flow out of tank cars under the influence of gravity alone. Such phenomena as thickening, gel formation, and sedimentation are undesirable because they impair or prevent gravity flow.

When the kaolin is not calcined and has a limited content of particles larger than 2 micrometers (equivalent spherical diameter), is relatively simple to produce a stable high solids (70 percent) suspension of the clay. A powerful anionic deflocculant such as a polyacrylate salt or tetrasodium pyrophosphate (TSPP) is added to a filter cake of acid negatively charged particles of clay, the cake being at about 60 percent solids, and additional dry clay is incorporated with agitation until the suspension has the desired high solids content. The TSPP is usually employed in an amount within the range of 0.3 percent to 0.5 percent based on the dry clay weight. This corresponds to the use of 6 to 10 lbs. TSPP/ton of clay. Typically, the pH of such slurries is in the range of 6.5-8.5. Such suspensions are stable in the sense that there is minimal settling of particles to form a dense sediment and minimal formation of a clear or cloudy supernatant liquid layer when the suspension is allowed to stand. This is attributable to the fact that suspensions of the fine kaolin clay are fairly viscous and contain only small amounts of coarse particles. Few particles of clay, if any, have sufficient mass to settle under the influence of gravity.

However, when clay pigments contain significant amounts of coarse particles, especially particles larger than 2 micrometers, and the content of ultrafine particles is low, there is a marked tendency of coarse particles to settle out of deflocculated suspensions of the clay. For example, 70 percent solids deflocculated suspensions of filler grades of hydrated kaolin clay tend to form hard sediments during shipment or storage. These filler clays usually contain at least 20 percent by weight of particles larger than 5 micrometers and at least 35 percent larger than 2 micrometers.

High solids deflocculated suspensions of calcined clay pigments having particle size distributions similar to those of uncalcined filler clays tend to form hard sediments during storage. Furthermore, calcined clay pigments have unusual rheological properties and the problem of producing stable high solids suspensions is even more difficult than when a typical uncalcined clay is involved. Relatively coarse particle size calcined kaolin clay products such as SATINTONE® clay usually cannot even be prepared into suspensions containing more than 60 percent solids by conventional techniques without producing systems which are highly dilatant. In the case of ultrafine low abrasion grades, such as ANSILEX® pigment, fluid suspensions containing more than about 50 percent solids cannot be prepared without impairing the opacifying capacity of the material by subjecting the pigment to excessive mechanical action in dry or wet state. Dilatant systems obtained by slurrying ultrafine particle size grades of calcined kaolin clay resemble quicksand. When a stirring rod is dropped into a fluid concentrated slurry of calcined clay, it may be impossible to extricate the stirring rod unless the stirring rod is removed very slowly. The shearing force applied to the suspension results in the conversion of the originally fluid system into a mass which becomes increasingly viscous as the rate of shear increases. Processing equipment such as mixers and pumps would be damaged by such highly dilatant suspensions or the equipment would stop operating.

A conventional method of maintaining various particulate solids in suspension in fluid media is to thicken the suspending media with suitable colloidal additives. This principle has been advocated to prevent sedimentation in high solids suspensions of filler grades of uncalcined clay. In accordance with the teachings of U.S. Pat. No. 3,130,063 to Millman et. al., an organic polymeric thickening agent, preferably CMC, is added to a previously deflocculated suspension of coarse filler clay in amount sufficient to thicken (and thereby stabilize) the suspension. Anionic dispersants (deflocculating agents) are used. However, organic polymers such as CMC are subjected to bacterial degradation. Consequently, clay slurries stabilized with such polymers may arrive at their destination in the form of gray or black masses having a putrid odor. Obviously, it is desirable to avoid stabilizing a deflocculated clay suspension with such thickening agents since preservatives are costly.

It has been suggested (U.S. Pat. No. 3,014,836 to Proctor) to reduce the viscosity of calcined clay pigments by milling the calcined clay under wet or dry conditions. The preferred procedure, as set forth in the patent, is to deflocculate a 55 percent to 60 percent solids suspension of the calcined clay with a conventional amount of a dispersant (0.3 percent TSPP) and ball mill the suspension for 12 to 24 hours. The slip of ballmilled clay is then flocculated by adding acid or alum. The flocculated calcined clay is subsequently dried and then it is mixed with water and dispersing agent to produce a 70 percent solids suspension. Proctor did not attempt to produce directly the desired 70 percent solids suspensions of calcined clay and he was not concerned with the sedimentation properties of his suspensions. Furthermore, Proctor did not address the problem resulting from the fact that milling would impair the opacifying properties of the clay.

Similarly, U.S. Pat. No. 3,754,712 to Cecil is concerned with a method for preparing fluid high solids suspensions of calcined clay which are stable without the necessity of adding colloidal thickening agents. Cecil's process involves pebble milling a slurry of anionically dispersed calcined clay and gradually adding more clay to increase solids while the slurry is being milled. Cecil et. al. did not consider the fact that the milling impaired opacification. See also U.S. Pat. Nos. 4,118,245, (Hamil, et. al.) and 4,118,246 (Horzepa et. al.) Among the known dispersants disclosed in U.S. Pat. No. 4,118,246 are condensed phosphate, amino hydroxy compounds such as 2-amino, 2-methyl, 1-propanol (AMP), sodium citrate and sodium naphthalene formaldehyde condensates, alone or in combination.

Marchetti et. al., U.S. Pat. No. 4,118,247 addresses the problem unique to the preparation of slurries of acidic, acid-treated montmorillonite clay pigments. A combination of condensed phosphate and AMP or other amino alcohol is used as the dispersant. In a preferred embodiment, the slurries also contain calcined kaolin clay pigments in major or minor amounts. We have carried out tests using procedures of U.S. Pat. No. 4,118,247 and found that anionic dispersions are formed.

In accordance with U.S. Pat. No. 4,107,325 to Eggers, aqueous slurries containing 50 percent or more of calcined clay are prepared by employing a mixture of the calcined clay with a significant amount of uncalcined kaolin clay. Practice of the invention necessitates the use of large amounts of additives including dispersants (and suspending agents). This technique necessitates dilution of the calcined clay with substantial amounts of hydrated clay and thus limits the utility of the products for some end use applications. Furthermore, the high solids slurries were undesirably dilatant.

U.S. Pat. No. 3,804,65 to Kaliski teaches the use of combinations of normally-used anionic dispersants along with nonionic surfactants and cationic surfactants to provide a stable pigment slurries. The slurries are only usable at high pH, at least 8 or higher, and preferably 8.5 to 11. In some cases pH values as high as 13 are stated to be desirable.

An object of the instant invention is to overcome the limitations of prior art processes for manufacturing high solids slurries of calcined kaolin clay.

THE INVENTION

We have discovered a simple method for preparing high solids suspensions of calcined clay which are stable without the necessity of adding a colloidal thickening agent and have minimal dilatancy.

Stated briefly, in accordance with this invention, a calcined kaolin clay pigment is mixed with water to provide an acidic slurry containing a dispersant effective amount of a water-soluble cationic organic material, thereby converting the calcined clay from its initially negatively charged state to positively charged state.

This invention provides a cationic pigment which is dispersed (deflocculated) in water at an acid pH. Anionic dispersion requires a near-neutral or alkaline pH. Slurries of the invention are thus particularly useful in systems where dispersion at an acid pH is necessary.

In a preferred embodiment of the invention, the calcined clay pigment is a fine particle size low abrasion material. See, for example, U.S. Pat. No. 3,586,523 (Fanselow et. al.), the teachings of which are incorporated herein by cross-reference.

A preferred cationic dispersant is a diallyl ammonium polymer salt.

The present invention utilizes a cationic rather than an anionic dispersant such as are invariably used alone or in some cases with an amino alcohol to disperse clay, resulting in an acidic, rather than a neutral or mildly alkaline slurry.

Slurry shipments of anionic calcined ultrafine clay pigments at 50 percent solids require the presence of thickening agents to prevent settling of the particles. Slurries of the invention would not require the presence of a suspending agent.

Slurry shipments of calcined kaolin gradually increase in viscosity with time. Cationically dispersed calcined kaolin appears to be viscosity stable with time.

The invention potentially affords a host of other benefits. For example, calcined kaolin that has been dispersed cationically will co-flocculate with cellulose fibers since, under normal papermaking conditions, the fibers are negatively charged. The positive and negative particulates attract each other and stick together. This phenomenon suggests that a cationic calcined kaolin could be a "self-retaining" filler and would not require the addition of retention aids. The use of retention aids by a papermaker is troublesome since they are expensive and the addition rate for maximum retention is difficult to control.

Previous publications have described the use of cationic coating formulations based on calcium carbonate, hydrated kaolin and mixtures thereof and claimed for them certain advantages over the normal anionic coating formulations. A cationic calcined kaolin could be added directly to a cationically dispersed coating formulation without the user having to pretreat the calcined kaolin to render it cationic. (A normal anionically dispersed kaolin, when added to a cationic formulation, would flocculate the system giving a high viscosity, unworkable paste.)

Current practice in the electrodeposition of paints is to deposit the pigment and binder particles from a suspension in which all the particles are cationically dispersed. Anionically dispersed pigments are difficult to convert to the cationic form since relatively large amount of a cationic compound are required to overcome the anionic particle charge. A pigment with a high cationic charge could be added to the electrodeposition system without the cost of additional chemicals and without the danger of flocculation.

The preferred diallyl polymer salt used in practice of the invention provides an electrically conductive film when the aqueous solution is dried. It is believed that treatment of calcined kaolin would give a product of greater electrical conductivity. This could have advantages in certain non-impact printing processes which required a coated paper with some degree of electrical conductivity.

DETAILED DESCRIPTION

Coarse particle size calcined clay within the scope of the invention may contain from 0 percent to 30 percent by weight of particles larger than 5 micrometers (ESD) and at least 35 percent larger than 2 micrometers. The invention is of special benefit when used with low abrasion ultrafine particle size calcined clay (e.g., calcined clay in which about 88 percent is finer than 2 micrometers and at least about 50 percent is finer than 1 micrometer), exemplified by ANSILEX® and ANSILEX 93 pigments.

As used in this specification, the term "calcined kaolin clay pigment" shall include kaolin clays which have been heated to over 400° C. to render same dehydroxylated. The term thereby embraces fully calcined kaolins-which usually have been heated above 980° C. exotherm, as well as so-called "metakaolin," which results from heating to lower temperatures below the exotherm. Reference is made to Fanselow et. al., U.S. Pat. No. 3,586,823 and to Morris U.S. Pat. No. 3,519,453; Podschus, U.S. Pat. Nos. 3,021,195 and 3,309,214, and British Pat. No. 1,181,491 some of which are concerned with kaolins pigments which are calcined at lower temperatures and which therefore can be regarded as metakaolins. Generally, the pH of calcined pigments (20 percent solid slurries with no added dispersant, using deionized water to form slurries) is in the range of 4 to 7, more usually 5 to 6.

Prior to slurry formation according to our invention, the calcined clay may be blended with minor amounts (e.g., 1 percent to 20 percent based on the weight of the clay) of mineral pigments such as titania or uncalcined kaolin. Calcium carbonate, another commonly used pigment, tends to dissolve at acidic pH values.

The process of the present invention is conveniently carried out by adding a dispersant effective amount of the cationic compound to the required amount of water for the desired solids in a container equipped with a stirrer. Once the cationic dispersant has dissolved, the calcined kaolin is added slowly with sufficient agitation to give a smooth, uniform, fluid suspension. If necessary, the slurry may be passed through a sieve to remove any undispersed aggregates or coarse impurities. If the slurry is at about 50 percent solids, it may be shipped to the user at these solids in tank cars or trucks. Should a dry cationic product be desired, the slurry may be dried using spray driers or other commonly used drying techniques.

Presently preferred dispersants are water soluble cationic polyelectrolytes. See, for example, U.S. Pat. No. 4,174,279. Cationic polyelectrolytes are characterized by a high density of positive charge. Positive charge density is calculated by dividing the total number of positive charges per molecule by the molecular weight. Generally the high charge density of polyelectrolytes exceeds $1 \times 10^{-3}$ and such materials do not contain negative groups such as carboxyl or carbonyl groups. In addition to the alkyl diallyl quarternary ammonium salts, other quarternary ammonium cationic polyelectrolytes are obtained by copolymerizing aliphatic secondary amines with epichlorohydrin. See U.S. Pat. No. 4,174,279. Still other water-soluble cationic polyelectrolytes are poly(quarternary ammonium) polyester salts that contain quarternary nitrogen in a polymeric backbone and are chain extended by the groups. They are prepared from water-soluble poly(quarternary ammonium salts) containing pendant hydroxyl groups and bifunctionally reactive chain extending agents; such polyelectrolytes are prepared by treating an $N, N, N^{(1)}, N^{(1)}$ tetraalkylhydroxyalkylenediamine and an organic dihalide such as a dihydroalkane or a dihaloether with an epoxy haloalkane. Such polyelectrolytes and their use in flocculating clay are disclosed in U.S. Pat. No. 3,663,461. Other water soluble cationic polyelectrolytes are polyamines. Polyamines are usually supplied commercially under trade designations; chemical structure and molecular weight are not provided by the suppliers.

Cationic dispersants used in practice of this invention also include low molecular weight polyamines (e.g., ethylene diamine or hexamethylene diamine), long carbon chain amines or quarternary ammonium salts (e.g., "ditallowdimethyl" ammonium chloride).

The aforementioned cationic dispersants are known when used at appropriate dosages to flocculate negatively charged clays. See, for example, U.S. Pat. No. 4,738,726 (Pratt et. al.), and references cited therein. It should be noted that as incremental dosages of such cationic materials are added to anionically charged particles, the initial effect is that of flocculation. As dosages increase beyond the levels at which flocculation occurs, dispersion (deflocculation) occurs and the charge on the particles becomes positive.

The amount of cationic dispersant required depends on the nature of the cationic dispersant as well as the nature of the surface of the pigment particles. In most cases the amount of cationic dispersant used is such that the slurry of calcined clay has minimum Brookfield viscosity of 90 mPa.s measured at 100 rpm. A lower molecular weight diallyl polymer salt is less effective in conferring a cationic charge than is the same polymer of higher molecular weight. Quarternary ammonium polymers of high charge density are more effective than those of lower charge density. Higher surface area, fine particles pigments require more dispersant than do coarser particles. The magnitude of the anionic charge before treatment with the cationic dispersant also affects the amount required. A pigment carrying a high anionic charge will require a greater amount of cationic dispersant than will a pigment which initially has a lower anionic charge.

A dimethyl diallyl quarternary ammonium chloride polymer commercially available under the trademark designation Polymer 261 LV from the Calgon Corporation having a molecular weight estimated to be between 50,000–250,000 has been found particularly useful in the practice of the present invention.

With commercial calcined pigments, 0.2 to 0.3 percent by weight of Calgon's 261LV will usually result in a fluid, deflocculated slurry. Higher quantities (for example up to about 0.8 percent by weight) may impart greater fluidity, especially when the viscosity is measured at high shear rates.

The following examples are given to illustrate the invention.

EXAMPLE 1

This example illustrates the preparation of a 50 percent solids content slurry of a commercially available calcined kaolin pigment (supplied under the trademark ANSILEX 93) using a cationic polyelectrolyte (Calgon 261LV polymer) as the dispersing agent. The polymer was supplied in aqueous solution containing 42 percent active material.

In an initial experiment, a slurry was made down by a Kitchen Aid mixer (Model K5SS) at the low speed setting for stirring. A dilute solution of cationic dispersant was prepared by placing 500.0 grams of deionized water and 2.976 grams of Calgon 262LV polymer into the stainless steel bowl attachment on the mixer. The two ingredients were stirred for five minutes. The total amount of ANSILEX 93 pigment added to the diluted polymer solution was 500.0 grams, however, after a substantial amount was added gradually, the slurry became thicker. The thickened slurry was gradually fluidized by slowly adding 0.36 grams of undiluted polymer to it followed by the slow addition of the remaining amount of ANSILEX 93 pigment. After all of the ingredients were added the slurry was dilatant. Stirring continued for another fifteen minutes. The resulting slurry contained 0.28 percent Calgon 261LV polymer based on the weight of the dry pigment and the slurry solids content was exactly 50.6 percent.

A portion of the slurry was diluted to exactly 50.0 percent solids content with deionized water. Due to the very dilatant nature of the slurry, the deionized water was added to the slurry gradually during manual mixing of the slurry with a spatula, followed by mixing on a roller mill for fifteen minutes.

Tests were carried out to determine the slurry pH, specific conductivity, and Brookfield viscosity at 20 and 100 rpm.

To determine the effect of extra cationic dispersant on the properties of the original slurry, 0.01 percent Calgon 261LV polymer (based on the weight of the pigment) was added gradually to the slurry while stirring the slurry manually with a spatula, followed by mixing on a roller mill for fifteen minutes.

Tests were carried out again to determine the slurry pH, specific conductivity, and Brookfield viscosity.

Results are summarized in TABLE 1. Data in this table show that when the amount of polymer in the original slurry was increased from 0.28 percent to 0.29 percent Calgon 261LV polymer (based on the weight of dry pigment), the slurry pH remained at 4.0; however, the slurry specific conductivity increased from 790 $\mu$mhos to 820 $\mu$mhos, and the slurry Brookfield viscosity increased from 60 cp to 80 cp at 20 rpm and from 94 cp to 114 cp at 100 rpm.

Finally, 0.3 cc of sulfuric acid (5 percent active solution) was gradually added to the slurry to see if the viscosity of the slurry improved; it was noted that acid addition thickened the slurry severely.

TABLE 1

Effects of Additional Cationic Polymer on a 50% Solids ANSILEX 93 Slurry Originally Dispersed with 0.28% Calgon 261 LV Polymer

| Total Calgon 261 LV Polymer (% on pigment) | Slurry pH | Slurry Sp. Cond. ($\mu$mhos) | Brookfield Viscosity* cp @ 20 rpm | 100 rpm |
|---|---|---|---|---|
| 0.28 | 4.0 | 790 | 60 | 94 |
| 0.29 | 4.0 | 820 | 80 | 104 |

*measured with spindle number 2 at the tenth revolution of the spindle.

EXAMPLE 2

This example illustrates the effect of varying the amount of a cationic polyelectrolyte (Calgon 261LV polymer) on characteristics and properties of nominally 50 percent solids slurries of ANSILEX 93 calcined clay pigment as well as some performance properties indicated by black glass scattering data. See TABLE II.

The specified amount of 261LV was dissolved in 250 ml. of deionized water in the bowl of a Kitchen-Aid ® mixer. Two hundred and fifty (250) grams of oven dried calcined clay was added slowly with moderate mixing until all of the clay has been added. When all of the clay had been added, the speed of mixing was increased somewhat and continued for an additional 10 minutes. The samples were then stored in tightly sealed jars until the measurements reported in TABLE II were made. Levels of polymer in the 0.05 percent to 0.25 percent range did not give a fluid mixture since these smaller quantities flocculated the clay.

As the data of TABLE II show, the use of the cationic polymer at levels of 0.3 percent and above, provided a positively charged, acidic, fluid slurry. The opacity, as measured by black glass scattering was improved or at least equivalent to that of the anionic product. High shear viscosity, as measured by the Hercules viscometer, was improved at the higher levels of polymer addition.

TABLE II

EFFECT OF DISPERSING CALCINED CLAY WITH 261 LV CATIONIC POLYELECTROLYTE

| % CATIONIC POLYELECTROLYTE | % SOLIDS | VISCOSITY B' FIELD (NOTE 1) | VISCOSITY HERCULES (NOTE 2) | pH (NOTE 3) | ZETA POTENTIAL (NOTE 4) | FILMS ON BLACK GLASS GLOSS (NOTE 5) | S 457 (NOTE 6) | S 577 |
|---|---|---|---|---|---|---|---|---|
| 0.00 | 50.3 | 145 | 210 | 5.48 | −51 | 53 | 282 | 191 |
| 0.30 | 50.9 | 158 | 185 | 3.65 | +33 | 20 | 316 | 228 |
| 0.35 | 51.2 | 112 | 245 | 3.67 | +37 | 38 | 295 | 213 |
| 0.40 | 51.2 | 92 | 275 | 3.82 | +37 | 44 | 283 | 200 |
| 0.50 | 51.1 | 139 | 365 | 3.77 | +45 | 59 | 270 | 185 |
| 0.70 | 50.9 | 138 | 505 | 3.86 | +47 | 57 | 282 | 197 |

(1) mPa.s (cp) 100 rpm at given solids.
(2) rpm for 0.16 Nm (16 "dynes") at 50.0% solids.
(3) Measured at % solids shown.
(4) Measured on Lazer Zee Meter, millivolts.
(5) Tappi 75° gloss, %.
(6) m²/kg

EXAMPLE 3

An experiment was carried out to determine if a cationic calcined clay would co-flocculate with pulp fibers.

If coflocculation occurs, it would indicate that a self-retaining cationic filler might be a viable product.

Pulp was prepared using a WARING BLENDOR® mixer into which was placed deionized water and laboratory filter paper. After about 2 minutes mixing at high speed, a uniform dispersion of pulp fibers was obtained.

Four 100 ml glass cylinders were filled with the mixtures described below:
1. Deionized water+2 drops (ca. 0.1 ml) of 50 percent solids anionic ANSILEX 93 pigment.
2. deionized water+2 drops (ca. 0.1 ml) of 50 percent solids slurry of ANSILEX 93 pigment which had been made cationic by treatment with 0.41 percent Calgon 261LV.
3. As 1 (anionic pigment)+anionic pulp fibers.
4. As 2 (cationic pigment)+anionic pulp fibers.

The four cylinders were mixed by hand shaking and then allowed to stand undisturbed for about 20 minutes. At the end of this time, the samples had the following appearance:

Cylinders 1 and 2 appeared to be composed of a uniform dispersion of clay particles which settle only very slowly. This appearance is typical of dispersed clay particles and indicates that both the anionic and cationic samples were deflocculated. Cylinder 3 (the mixture of anionic pigment with the anionic pulp fibers) appeared to be similar to cylinders 1 and 2 in that the clay was dispersed uniformly. The pulp fibers, being fairly large in comparison with the clay, had settled somewhat but appeared to be dispersed. Cylinder 4 (the mixture of cationic pigment and anionic fibers) showed a markedly different appearance. In the case of cylinder 4, both the clay and pulp fibers had settled to the bottom and the supernatant liquid was clear and completely free of suspended particles. This behavior is typical of flocculated systems and shows that the clay is co-flocculating with the paper fibers.

EXAMPLE 4

An experiment was performed in the laboratory whereby a slurry of ANSILEX 93 was prepared at 50 percent solids content using 1 percent Calgon and 2 percent AMP (2-amino, 2-methyl, 1-propanol propanol) as dispersants. Percentages are based on the weight of ANSILEX 93 pigment. Tests were carried out to determine slurry pH, Brookfield viscosity, and particle charge (zeta potential). A similar experiment is shown in U.S. Pat. No. 4,118,247 (Marchetti et. al.) Example 11 where 30 parts acid treated montmorillonite and 70 parts ANSILEX pigment were used as kaolin pigments.

The slurry was made down by a Kitchen Aid mixer (Model K5SS) placed on the low speed setting number 2. Initially a diluted solution of both dispersants was prepared by placing 500.0 grams of deionized water into the stainless steel mixing bowl following which 5.000 grams of Calgon was added and stirred for five minutes, and 10.526 grams of AMP (95 percent active) was then added and stirred for five minutes more. Five hundred grams (500.0 g.) of ANSILEX 93 pigment was gradually and continuously added to the stirring dispersant solution and the mixing continued for another fifteen minutes. The resulting slurry contained exactly 50.0 percent solids content, and its pH was 10.7. The slurry Brookfield viscosity measured with spindle number two was 210 cp at 20 rpm and 144 cp at 100 rpm.

A zeta potential value of −53 mv. (negative 53) was obtained using the Lazer Zee Meter Model 501 (PEN KEM Inc.). The sample was prepared by diluting a drop of the original 50.0 percent solids slurry with 50 ml of the supernatant or "mother liquor" extracted from the slurry by centrifugation.

The slurry shown in Example II, U.S. Pat. No. 4,118,247 prepared at 52.4 percent solids content (acid treated montmorillonite and ANSILEX) with the same amounts and types of dispersants, resulted in a slurry Brookfield viscosity of 350 cps at 100 rpm, 420 rpm and 150 cps. The slurry pH was 7.7.

pH measurements used in examples were obtained using the conventional glass electrode. The pH values reported in the examples were all measured at the indicated percent solids.

The magnitude and sign (positive or negative) of the electrical charge on the particles cited in this example and elsewhere herein are measured using the Lazer Zee® meter, Model 501, a product of Pen Kem, Inc. The measurement involves the determination of the velocity of migration of charged particle under a known potential gradient. The measurement is carried out in a dilute suspension of the slurry. From the measured electrophoretic velocity, the particle charge (zeta potential) can be calculated. Since cationic and anionic particles migrate in opposite direction at velocities proportional to the charge, both the magnitude of the charge and its sign, either positive or negative, can be measured. Other methods of measuring the magnitude and sign of the electrical charge on the particles can be used. For example, an acoustphoretic titrator, also manufactured by Pen Kem, can be utilized.

We claim:

1. A method for preparing a fluid stable aqueous slurry of particles of a calcined clay pigment suitable for use in coating or filling paper or as an extender pigment in paint which comprises providing dispersant-free particles of calcined kaolin clay and adding said particles to a solution of a water-soluble polymeric cationic dispersant in amount sufficient to impart a positive zeta potential to said particles of said pigment and to result in a pH in the range of about 3 to 4, said dispersant being selected from the group consisting of alkyl diallyl quarternary ammonium salts, quarternary ammonium cationic polyelectrolytes obtained by copolymerizing aliphatic secondary amines with epichlorohydrin and poly (quarternary ammonium) polyester salts.

2. The method as claimed in claim 1 wherein said cationic dispersant is added in amount in the range of about 0.2 to 0.8 percent based on the dry weight of the calcined clay.

3. The method of claim 1 wherein the amount of dispersant is such that said slurry has minimum Brookfield viscosity of 90 mPa.s measured at 100 rpm.

4. The method of claim 1 including the additional step of spray drying said fluid slurry of calcined clay, thereby providing a dried predispersed calcined clay pigment.

5. The spray dried product of claim 4.

* * * * *